United States Patent [19]

Ohuchi et al.

[11] Patent Number: 5,323,432
[45] Date of Patent: Jun. 21, 1994

[54] APPARATUS FOR ASSEMBLING NUCLEAR FUEL ASSEMBLY

[75] Inventors: Katsunori Ohuchi; Nobuo Miwa; Masashi Yoshida, all of Ibaraki, Japan

[73] Assignee: Mitsubishi Nuclear Fuel Co., Tokyo, Japan

[21] Appl. No.: 964,884

[22] Filed: Oct. 22, 1992

[30] Foreign Application Priority Data

Oct. 24, 1991 [JP] Japan ................................. 3-278096

[51] Int. Cl.[5] ........................................... G21C 19/00
[52] U.S. Cl. ..................................... 376/261; 376/269
[58] Field of Search ............... 376/261, 260, 272, 269; 976/DIG. 68; 29/906

[56] References Cited

U.S. PATENT DOCUMENTS 4,625,396 12/1986 Ahmed et al. ......................... 29/701
4,800,061 1/1989 Shallenberger et al. ........... 376/261
4,842,809 6/1989 Attix et al. ............................ 376/261

FOREIGN PATENT DOCUMENTS 0138711 4/1985 European Pat. Off. .
0337808 10/1989 European Pat. Off. .
3938163 5/1990 Fed. Rep. of Germany .
2181699 7/1990 Japan .

OTHER PUBLICATIONS

Database WPIL, Derwent Publications Ltd., AN 87-260207 & JP-A-62 179 698, Aug. 6, 1987 Abstract Translated.
Patent Abstracts of Japan, vol. 15, No. 435 (P-1272), Nov. 6, 1991 & JP-A-3 181 894, Aug. 7, 1991 Translated.
Database WPIL, Derwent Publications Ltd., AN 88-327059 & JP-A-63 241 495, Oct. 6, 1988 Abstract Translated.

Primary Examiner—Donald P. Walsh
Assistant Examiner—Meena Chelliah
Attorney, Agent, or Firm—Oblon, Spivak, McClelland, Maier & Neustadt

[57] ABSTRACT

The present invention presents an apparatus to facilitate the loading of specific fuel rods into the specific grid cells of the grids of a fuel assembly. The loading apparatus utilizes air-pressure operated loading cylinders to push out the specific fuel rods from a fuel rod magazine into the corresponding grid cells. The loading apparatus operates in conjunction with a series of fuel rod support rollers which provide support to the fuel rods, being charged into the grids, from the underside of the fuel rods to prevent sagging of the tip end, thus avoiding scraping against the straps of the grids when entering the grid cells, and causing potentially harmful surface scratches on the fuel rods.

5 Claims, 3 Drawing Sheets

APPARATUS FOR ASSEMBLING NUCLEAR FUEL ASSEMBLY

BACKGROUND OF THE INVENTION

1. Field of the Invention

The present invention relates to an apparatus for assembling a nuclear fuel assembly for nuclear reactors, and in particular to a simple apparatus for loading fuel rods into the fuel assembly efficiently.

2. Background Art

A conventional fuel assembly such as the one disclosed in a U.S. Pat. No. 5,068,081, shown in FIG. 2, is known.

In this figure, the numerals 1 and 2 refer to top and bottom nozzles, respectively, which are disposed vertically and oppositely spaced apart, and having a plurality of rigidly fixed control-rod guide pipes 3 (hereinbelow referred to as guide pipes 3) between the top nozzle 1 and the bottom nozzle 2. In the mid section of the guide pipes 3 are a plurality of grids 4 disposed vertically and spaced apart from each other.

The grids 4 are, as shown in FIGS. 3 to 5, constructed of a plurality of straps 7 made of thin metal strips having slits 8 formed in the longitudinal direction thereof, and by interlocking the slits 8 to form lattices. The structure formed by the lattices is known as the grid cells 5, and a dimple 9 and spring 10 are formed on each of the opposing walls of the grid cells 5. A fuel rod 6 inserted into a grid cell 5 is pressed against the dimple 9 by the spring 10, thereby holding the fuel rod 6 firmly in the grid cell 5 therebetween.

A method of inserting a fuel rod 6 in a grid cell 5 is known, for example, in Japanese Patent Application, Laid-open publication (Kokai) H2-181,699 which involves the use of a key device to deactivate the spring 10, and gripping the tip of a fuel rod 6 by means of a pull-in device, which then enables the fuel rod 6 to be pulled into the grid cell 5.

However, such methods presented problems because of the necessity of pull-in device and other ancillary control devices, and the complexities of the devices mean that the operations become cumbersome and lengthy.

SUMMARY OF THE PRESENT INVENTION

The present invention was made to resolve the above mentioned problems associated with the conventional assembling apparatus, by providing an apparatus of a simple mechanical construction, enabling the insertion of fuel rods into the grids efficiently and without causing surface damages on the fuel rods.

An apparatus for assembling a fuel assembly containing longitudinally extending fuel rods comprises:
  (a) a longitudinally extending fuel rod magazine containing a plurality of fuel rods;
  (b) a plurality of fluid-pressure operated loading cylinders provided on the fuel rod magazine, for pushing specific fuel rods of the plurality of fuel rods in a longitudinal direction into the grid cells, wherein each of the loading cylinders are disposed coaxially with corresponding ones of the plurality of fuel rods contained in the fuel rod magazine;
  (c) a plurality of grid support frames spaced apart and disposed in the longitudinal direction of the assembly so as to vertically support the plurality of fuel rods being loaded into the grid cells of the grids.

According to the present invention, it becomes possible to insert the fuel rods into the grids by first placing the grids in the grid support frames, and simply by operating the fluid-driven loading cylinders provided on the invented assembling apparatus, it becomes possible to push the specified fuel rods out of the fuel rod magazine towards the grids, and inserting the fuel rods into the corresponding grid cells. Therefore, the assembly operation involves only the operation of the pressure-driven loading cylinders in association with a fuel rod magazine which hold the plurality of fuel rods. Therefore, the construction of the assembling apparatus is simplified significantly in comparison to the conventional apparatus such as the pull-in rods system.

The operational procedure is correspondingly simplified because the necessity of complex operations such as gripping of the fuel rods has been eliminated.

PREFERRED EMBODIMENT OF THE PRESENT INVENTION

A first embodiment will be explained with reference to FIG. 1. In the following explanation, the component sections which are common to the conventional fuel assembly are given the same reference numbers, and their explanations are omitted. In the following descriptions, the direction is referenced with respect to the travel direction of the fuel rods which travel longitudinally from the left to the right of the figures. Therefore, the left side of a component section is referred to as the entry-side and the right side thereof a the exit-side.

Figure 1:
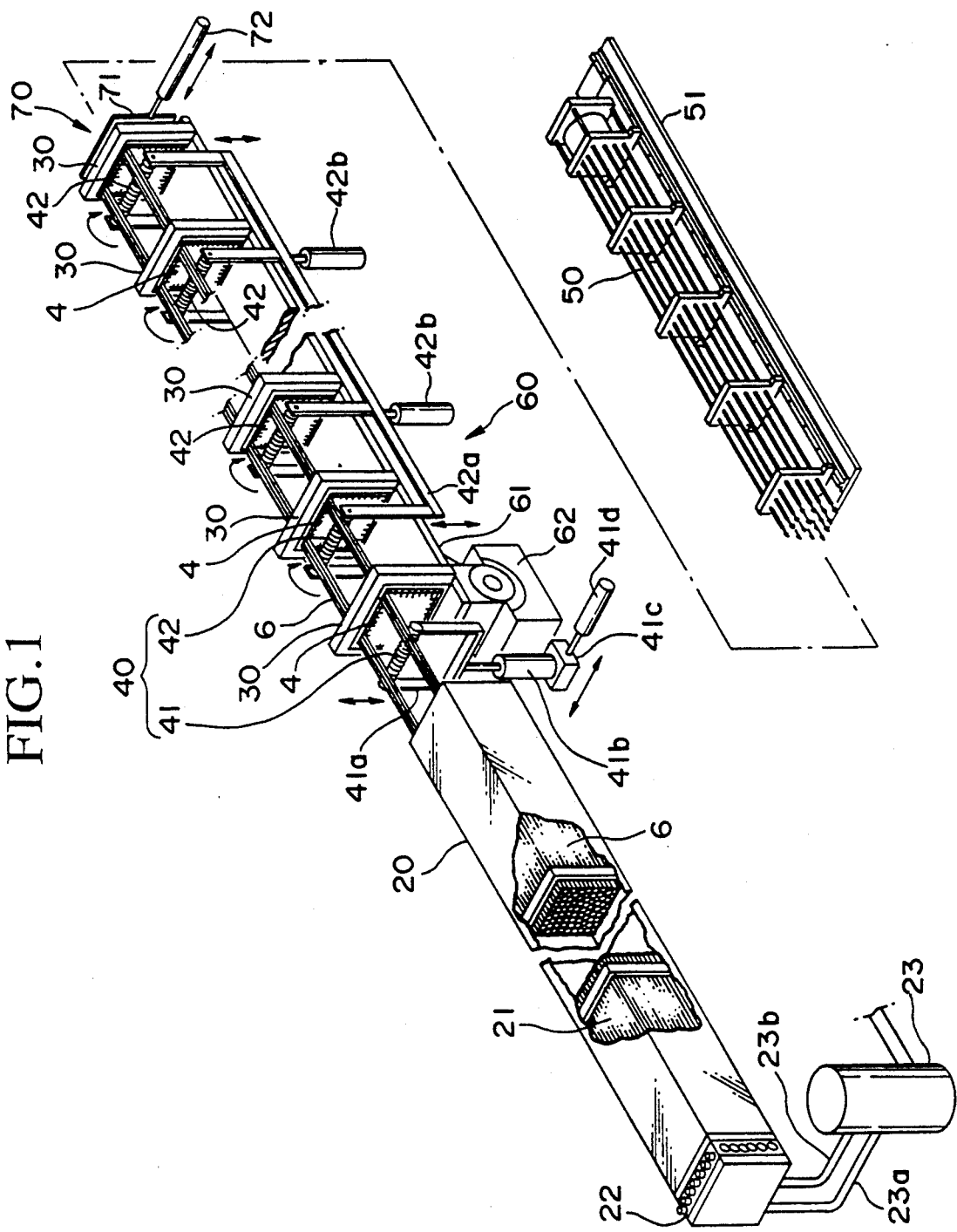
FIG. 1 is an oblique view illustrating a first embodiment for an assembling apparatus of the present invention.
Figure 2:
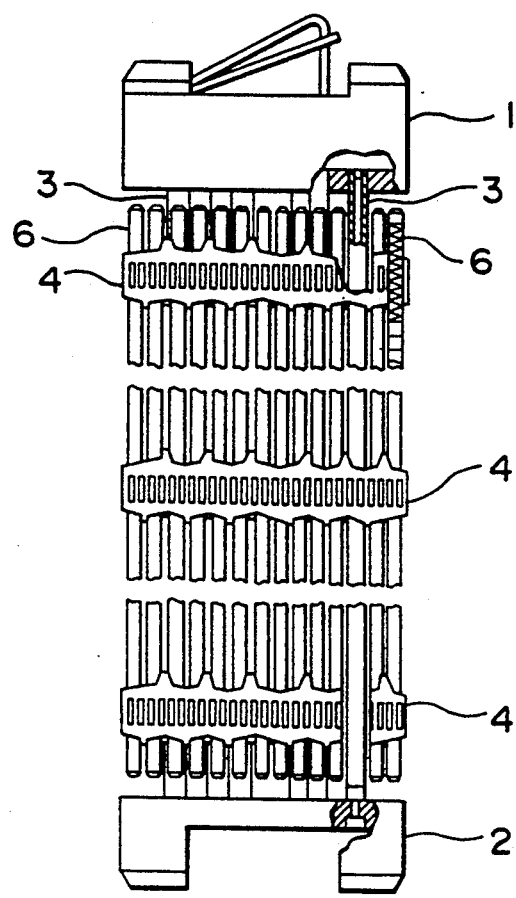
FIG. 2 is a side view of a conventional fuel assembly.
Figure 3:
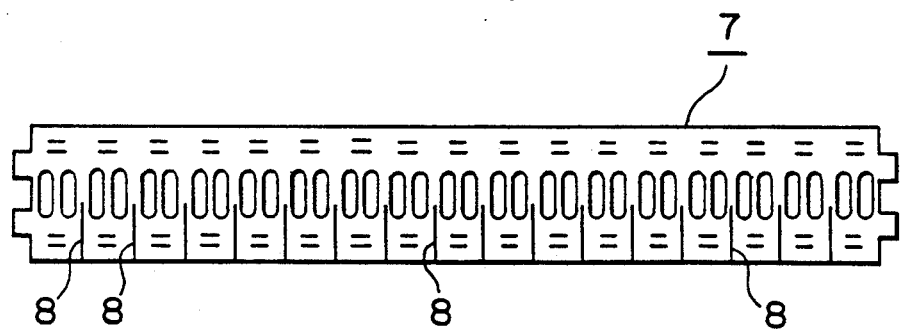
FIG. 3 is a front view of a strap used in forming the grid cells of the grids.
Figure 4:
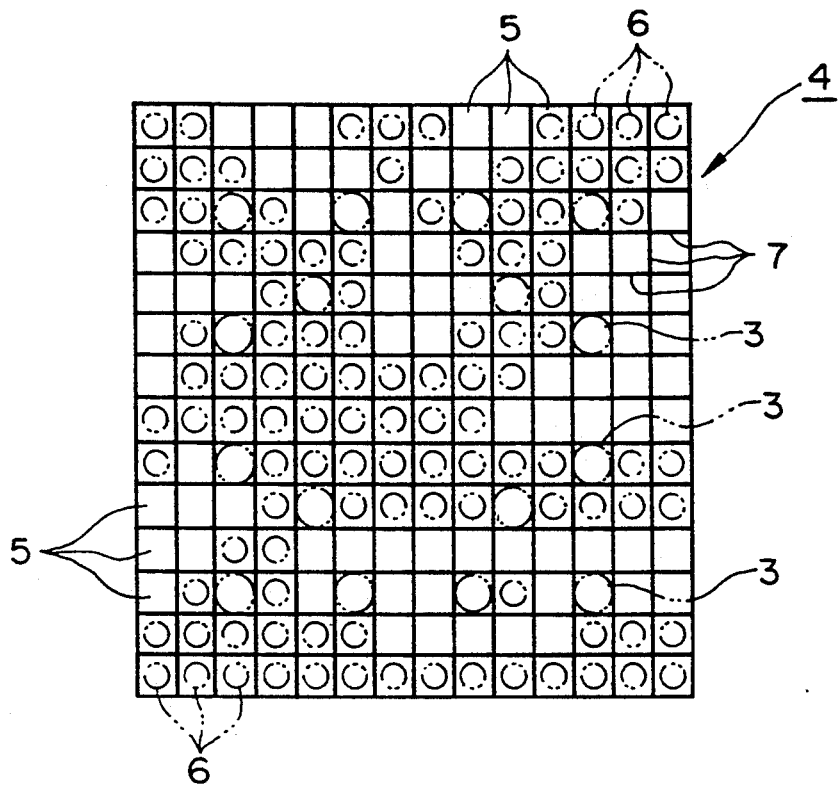
FIG. 4 is a cross sectional view of a fuel assembly containing a plurality of fuel rods and a plurality of guide pipes which hold the assembly together.
Figure 5:
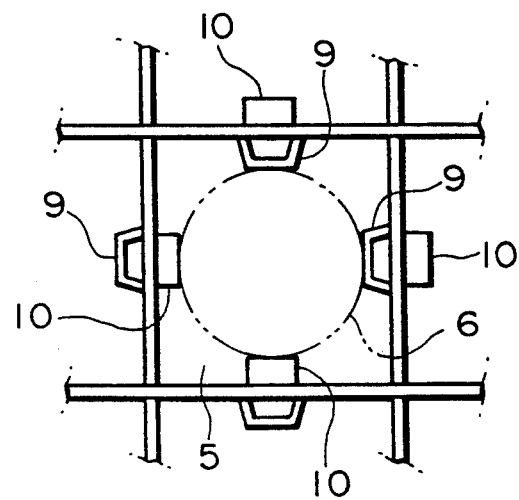
FIG. 5 is an enlarged partial view of a grid cell holding a fuel rod firmly therein.

The assembling apparatus comprises:

a fuel rod magazine 20 of a rectangular tube-shape which houses a plurality of air operated loading cylinders 21 (termed air cylinders) of a shorter length than the fuel rods 6, and are disposed coaxially with and equal in number to fuel rods 6;

fuel rods 6 which are housed in the magazine 20 coaxially with the air cylinders 21, and which are pushed by the air cylinders 21 in one direction (towards the right in FIG. 1);

a plurality of grid support frames 30 (hereinbelow referred to as grid support 30), spaced apart in the direction of the fuel rods 6, for freely detachably holding grids 4 with the grid cells 5 facing in the direction of the fuel rods 6;

a plurality of fuel rods support rollers 40 which are disposed at the entry-side of the grid support 30 (i.e. between a support frame 30 and the fuel rod magazine 20), providing support from underside to the fuel rods 6, exiting from the fuel rod magazine 20, and entering the grid cells 5, to prevent the rods 6 from sagging down;

an expander jig 50 which is inserted inside the space of the guide pipes 3, disposed on the grid cells 5, and is used to bulge the guide pipe 3;

a raising mechanism 60 which not only supports the grid support 30 but performs the function of raising the fuel assembly to a vertical position when assembling is completed; and a stopper 70 which is disposed on the exit-side (the right side in FIG. 1) of the grid support 30 farthest from the fuel rod magazine 20.

An air supply switching device 22 is disposed on the entry-side (left side in FIG. 1) of the fuel rod magazine 20 to which is attached an air supply unit 23, via supply pipes 23a.23b, for supplying air at a given pressure to the air supply switching device 22.

The air supply switching device 22 is constructed such that the air supply form the air supply unit 23 can be selectively supplied to air cylinders 21 so as to push out specified fuel rods 6 in the fuel rod magazine 20.

The support rollers 40 disposed on the exit-side of the fuel rod magazine 20 consists of an idler roller 41 and a driving roller 42 which is disposed on the upper portion of a support base 61 for the raising mechanism 60.

The idler roller 41 comprises: an idler frame 41a which freely rotatably supports the idler roller 41; a threaded support 41b which provides a freely movable vertical support to the frame 41a; and an idler cylinder 41d which moves the threaded support 41b transversely to the fuel rods 6 direction, via a base plate 41c.

The driving roller 42 is freely rotatably supported by a drive roller frame 42a which is disposed on the side region of the support base 61 of the raising mechanism 60, and is driven with an external power means. The drive roller frame 42a is freely movably supported vertically by means of a threaded support 42b.

The tip end (left end in FIG. 1) of each of the expander jig 50 is provided with a known bulging device for bulging the guide pipe 3. The jigs ar disposed on the jig base 51 freely movably in the fuel rod 6 direction so that they can be inserted inside the guide pipes 3.

The raising mechanism 60 comprises: a rotating base plate 61, disposed at the exit-side (right in FIG. 1) of the fuel rod magazine 20 and extending in the fuel rod 6 direction; a rotating mechanism 62 disposed underneath the entry-side end of the rotating base 61 for rotating the raising mechanism 60 from a horizontal position to a vertical position.

The stopper 70 comprises: a rectangular-shaped positioning plate 71 disposed at the exit-side of the farthest removed grid support 30 from the fuel rod magazine 20; and a stopper cylinder 72 which moves the positing plate 71 transversely.

The operation of the assembling apparatus of the above described construction will be presented in the following.

A grid 4 is installed in each of the grid supports 30 so that the grid cells 5 face in the direction of the fuel rods 6. Then a key is inserted into each of the grid cells 5 so as to deactivate the springs 10. By means of the threaded support 41b.42b, the top end of the support rollers 41.42 is adjusted to be at about the same height as the highest grid cells 5 or the grids 4.

Next, the air at a selected pressure is supplied to the air supply switching mechanism 22 from the air supply unit 23, and then the air pressure is applied only to those air cylinders 21 disposed at the topmost level of the fuel rod magazine 20.

By this step, only the fuel rods 6 which are disposed at the topmost level in the fuel rod magazine 20 are forwarded toward the grid 4.

The forwarded fuel rods 6 are supported at their lower surface by the idler roller 41 and are inserted into the respective grid cells 5 of the grid 4. The fuel rods 6 are next supported and driven forward further by means of the driving rollers 42, and enter the grid cells 5 of the next grid 4.

According to the embodiment presented, it is possible to prevent the tip of the fuel rods 6 being forwarded from the fuel rod magazine 20 to the grids 4 from sagging down due to their own weight, because of the supports provided by the idler roller 41 as well as by the driving rollers 42. If the tip of a fuel rod 6 is allowed to sag, there is a danger of introducing fine scratches on the surface of the fuel rod 6 due to mechanical interference of the fuel rod with the straps 7 which form the grids 4. An advantage of the apparatus presented in the above embodiment is that such a situation is prevented from happening, thereby improving the quality of the fuel assembly.

The topmost fuel rods 6 are thus progressively inserted into the grid cells 5 of the various grids 4, and the tips of the fuel rods are butted up against the positing plate 71 of the stopper 70, thereby positioning the topmost fuel rods 6 in the fuel assembly.

Next, the air supply switching mechanism 22 is again operated, and the air pressure to the topmost cylinders 21 is shut-off, then the threaded screws 41b.42b are lowered to align the top portion of the rollers 41.42 with the lower position of the grids 4 in the second highest level of grid cells 5 of the grids 4.

Next, by operating the air supply switching mechanism 22, the air pressure is applied to the cylinders 21 disposed at the second level of the fuel rod magazine 20. By following the same procedure presented for the topmost fuel rods 6, the fuel rods 6 in the second level are inserted into the respective grid cells 5 of the grids 4.

By repeating the above described sequence of events for other fuel rods 6 disposed at other levels of the fuel rod magazine 20, all the fuel rods are transferred into the grid cells 5 of the grids 4 from the fuel rod magazine 20.

According to the apparatus of the embodiment, it is possible to progressively insert all the fuel rods 6 into the successive grids 5 by operating only the air supply switching mechanism 22, thereby enabling to simplifying the construction of the assembling apparatus significantly compared with the conventional assembling apparatus relying on such devices as pull-in rods.

Furthermore, for the insertion of the fuel rods 6, it is only necessary that the air supply unit 23 be operated, without the necessity of additional operations such as gripping of the fuel rod 6 required in the pull-in rods system.

After the fuel rods 6 are inserted in the grids 4, the operating steps follow the conventional procedure, such as removing the keys from the grids 4, allowing the springs 10 to contact the surface of the fuel rods 6, thereby fixing the fuel rods 6 firmly in the required relative position in the grids 4.

Next, the fuel rod magazine 20 is removed from the assembling apparatus, and the required number of guide pipes 3 are inserted in the specific grid cells 5 of the grids 4, and the guide pipes 3 are bulged with the use of the expander jig 50, thus securely fixing the guide pipes 3 to the girds 4.

Next, the idler cylinder 41d attached to the idler roller 41 is contracted to remove the idler roller 41 from the front of the grids 4, the raising mechanism 62 of the rotating base 61 is operated to raise the rotating base 61 together with the drive roller frame 42a and the threaded support 42b, and the fuel assembly to a vertical position, and removing the fuel assembly from the assembling apparatus and transferring the assembly elsewhere to a specified location.

In the embodiment presented above, air-operated cylinders were used as an example of a fluid-driven cylinders, but it is apparent that oil-operated cylinders can function equally as well.

The present invention is not limited by the particular embodiment presented above, and includes other variations.

What is claimed is:

1. An apparatus for assembling fuel rods into a fuel assembly, comprising a plurality of longitudinally extending fuel rods firmly held in grid cells of a plurality of grids, said apparatus comprising:
   (a) a longitudinally extending fuel rod magazine containing said plurality of fuel rods;
   (b) a plurality of fluid-pressure operated loading cylinders provided on said fuel rod magazine, for loading specific fuel rods of said plurality of fuel rods into said grid cells, wherein each of said loading cylinders is disposed coaxially with a corresponding one of said plurality of fuel rods contained in said fuel rod magazine so as to push said corresponding one of said plurality of fuel rods from said fuel rod magazine to said grid cells;
   (c) a plurality of grid support frames spaced apart and disposed in the longitudinal direction of said assembly to support said plurality of grids so that said grid cells face in the direction of said fuel rods; wherein:
   a plurality of fuel rod support rollers are disposed in a longitudinal direction between said fuel rod magazine and said grid support frames, each of said plurality of fuel rod support rollers providing vertical support of said plurality of fuel rods from the underside thereof so as to prevent a sagging of the fuel rods; and
   each of said fuel rod support rollers comprise means for moving said support rollers in a vertical direction so as to enable a relative positioning of said support rollers with respect to said grid cells, such that a vertical position of said support rollers corresponds to a level of fuel rods in said fuel rod magazine and enables the loading of specific fuel rods into a corresponding coaxial grid cell.

2. A fuel rod assembling apparatus as claimed in claim 1, wherein said fluid-pressure operated loading cylinder is an air-pressure operated loading cylinder.

3. A fuel rod assembling apparatus as claimed in claim 1, wherein said plurality of support frames are disposed on the top surface of a rotating base extending in the direction of said fuel rods, wherein said rotating base is provided with a power means for raising said rotating base from a horizontal position to a vertical position.

4. A fuel rod assembling apparatus as claimed in claim 1, wherein a support frame farthest removed from said fuel rod magazine is provided with a stopper, on the exit-side of said support frame, to align the position of said plurality of fuel rods by contacting the tip end of said plurality of fuel rods.

5. A fuel rod assembling apparatus as claimed in claim 4, wherein said stopper disposed at the farthest position from said fuel rod magazine is provided with a positioning plate, at the exit-side of a support frame situated farthest from said fuel rod magazine; and a positioning cylinder which adjusts the position of said positioning plate transversely to the direction of fuel rods.

* * * * *